(12) United States Patent
Lu et al.

(10) Patent No.: US 11,461,415 B2
(45) Date of Patent: Oct. 4, 2022

(54) ASSESSING SEMANTIC SIMILARITY USING A DUAL-ENCODER NEURAL NETWORK

(71) Applicant: Microsoft Technology Licensing, LLC, Redmond, WA (US)

(72) Inventors: Wenhao Lu, Seattle, WA (US); Jian Jiao, Bellevue, WA (US); Ruofei Zhang, Mountain View, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 352 days.

(21) Appl. No.: 16/784,200

(22) Filed: Feb. 6, 2020

(65) Prior Publication Data

US 2021/0248192 A1 Aug. 12, 2021

(51) Int. Cl.
*G06F 16/953* (2019.01)
*G06F 40/284* (2020.01)
*G06F 40/289* (2020.01)
*G06F 40/30* (2020.01)
*G06N 3/08* (2006.01)
*G06Q 30/02* (2012.01)

(52) U.S. Cl.
CPC .......... *G06F 16/953* (2019.01); *G06F 40/284* (2020.01); *G06F 40/289* (2020.01); *G06F 40/30* (2020.01); *G06N 3/08* (2013.01); *G06Q 30/0241* (2013.01)

(58) Field of Classification Search
None
See application file for complete search history.

(56) References Cited

U.S. PATENT DOCUMENTS

2015/0074027 A1 3/2015 Huang et al.
2015/0278200 A1 10/2015 He et al.
(Continued)

FOREIGN PATENT DOCUMENTS

WO 2018/085710 A1 5/2018

OTHER PUBLICATIONS

Vig, Jesse, and Yonatan Belinkov. "Analyzing the structure of attention in a transformer language model." arXiv preprint arXiv:1906.04284 (2019). (Year: 2019).*

(Continued)

*Primary Examiner* — Frank D Mills

(57) ABSTRACT

A technique is described herein for processing a given query item in a latency-efficient and resource-efficient manner. The technique uses a first transformer-based encoder to transform the given query item into an encoded query item. In one case, the given query item is an expression that includes one or more query-expression linguistic tokens. The technique includes a second transformer-based encoder for transforming a given target item into an encoded target item. The given target item may likewise correspond to an expression that includes one or more target-expression linguistic tokens. A similarity-assessing mechanism then assesses the semantic similarity between the given query item and the given target item based on the encoded query item and the encoded target item. Each transformer-based encoder uses one or more self-attention mechanisms. The second transformer-based encoder can optionally perform its work in an offline manner, prior to receipt of the given query item.

19 Claims, 6 Drawing Sheets

(56) References Cited

U.S. PATENT DOCUMENTS

| | | |
|---|---|---|
| 2019/0114348 A1 | 4/2019 | Gao et al. |
| 2019/0354588 A1* | 11/2019 | Zhelezniak ............. G06F 40/30 |
| 2021/0049443 A1* | 2/2021 | Klaiman .................. G06N 3/04 |
| 2021/0141798 A1* | 5/2021 | Steedman Henderson ................. G06N 3/0454 |

OTHER PUBLICATIONS

Lu, et al., "TwinBERT: Distilling Knowledge to Twin-Structured BERT Models for Efficient Retrieval," arXiv:2002.06275v1 [cs.IR], Feb. 14, 2020, 8 pages.

Cer, et al., "Universal Sentence Encoder," arXiv:1803.11175v2 [cs.CL], Apr. 12, 2018, 7 pages.

Hill, et al., "Learning Distributed Representations of Sentences from Unlabelled Data," arXiv:1602.03483v1 [cs.CL], Feb. 10, 2016, 11 pages.

Kingma, et al., "Adam: A Method for Stochastic Optimization," arXiv:1412.6980v9 [cs.LG], Jan. 30, 2017, 15 pages.

Logeswaran, et al., "An Efficient Framework for Learning Sentence Representations," arXiv:1803.02893v1 [cs.CL], Mar. 7, 2018, 16 pages.

Raffel, et al., "Exploring the Limits of Transfer Learning with a Unified Text-to-Text Transformer," arXiv:1910.10683v2, Oct. 24, 2019, 53 pages.

Subramanian, et al., "Learning General Purpose Distributed Sentence Representations via Large Scale Multi-task Learning," arXiv:1804.00079v1 [cs.CL], Mar. 30, 2018, 16 pages.

Wolf, et al., "HuggingFace's Transformers: State-of-the-art Natural Language Processing," arXiv:1910.03771v4 [cs.CL], Feb. 11, 2020, 11 pages.

Zhu, et al., "Aligning Books and Movies: Towards Story-like Visual Explanations by Watching Movies and Reading Books," arXiv:1506.06724v1 [cs.CV] Jun. 22, 2015, 23 pages.

PCT Search and Written Opinion for PCT Application No. PCT/US2021/014238, dated May 10, 2021,14 pages.

Bojanowski, et al., "Enriching Word Vectors with Subword Information," in Transactions of the Association for Computational Linguistics, vol. 5, Jun. 2017, pp. 135-146.

Bucilă, et al., "Model Compression," in KDD '06: Proceedings of the 12th ACM SIGKDD International Conference on Knowledge Discovery and Data Mining, Aug. 2006, pp. 535-541.

Conneau, et al., "Supervised Learning of Universal Sentence Representations from Natural Language Inference Data," arXiv:1705.02364v5 [cs.CL], Jul. 8, 2019, 12 pages.

Datar, et al., "Locality-Sensitive Hashing Scheme Based on p-Stable Distributions," in SCG '04: Proceedings of the Twentieth Annual Symposium on Computational Geometry, Jun. 2004, pp. 253-262.

Devlin, et al., "BERT: Pre-training of Deep Bidirectional Transformers for Language Understanding," arXiv:1810.04805v2 [cs.CL], May 24, 2019, 16 pages.

Edelman, et al., "Internet Advertising and the Generalized Second-Price Auction: Selling Billions of Dollars Worth of Keywords," in American Economic Review, vol. 97, No. 1, Mar. 2007, pp. 242-259.

Friedman, et al., "An Algorithm for Finding Best Matches in Logarithmic Time," in ACM Transactions on Mathematical Software, vol. 3, No. 3, Sep. 1977, pp. 209-226.

He, et al., "Deep Residual Learning for Image Recognition," arXiv:1512.03385v1 [cs.CV], Dec. 10, 2015, 12 pages.

Hinton, et al., "Distilling the Knowledge in a Neural Network," arXiv:1503.02531v1 [stat.ML], Mar. 9, 2015, 9 pages.

Huang, et al., "Learning Deep Structured Semantic Models for Web Search using Clickthrough Data," in CIKM '13: Proceedings of the 22nd ACM international conference on Information & Knowledge Management, Oct. 2013, pp. 2333-2338.

Jiao, et al., "TinyBERT: Distilling BERT for Natural Language Understanding," arXiv:1909.10351v4 [cs.CL], Dec. 4, 2019, 14 pages.

Kiros, et al., "Skip-Thought Vectors," available at https://papers.nips.cc/paper/5950-skip-thought-vectors.pdf, in Advances in Neural Information Processing Systems, 2015, 9 pages.

Lan, et al., "ALBERT: A Lite BERT for Self-supervised Learning of Language Representations," arXiv:1909.11942v4 [cs.CL], Jan. 10, 2020, 17 pages.

Liu, et al., "Improving Multi-Task Deep Neural Networks via Knowledge Distillation for Natural Language Understanding," arXiv:1904.09482v1 [cs.CL], Apr. 20, 2019, 8 pages.

Liu, et al., "Multi-Task Deep Neural Networks for Natural Language Understanding," arXiv:1901.11504v2 [cs.CL], May 30, 2019, 10 pages.

Liu, et al., "RoBERTa: A Robustly Optimized BERT Pretraining Approach," arXiv:1907.11692v1 [cs.CL], Jul. 26, 2019, 13 pages.

Mikilov, et al., "Efficient Estimation of Word Representations in Vector Space," arXiv:1301.3781v3 [cs.CL], Sep. 7, 2013, 12 pages.

Mirzadeh, et al., "Improved Knowledge Distillation via Teacher Assistant," arXiv:1902.03393v2 [cs.LG], Dec. 17, 2019, 11 pages.

Pennington, et al. "Glove: Global Vectors for Word Representation," in Proceedings of the 2014 Conference on Empirical Methods in Natural Language Processing (EMNLP), Oct. 2014, pp. 1532-1543.

Peters, et al., "Deep contextualized word representations," in arXiv:1802.05365v2 [cs.CL], Mar. 22, 2018, 15 pages.

Radford, et al., "Improving Language Understanding by Generative Pre-Training," available at https://s3-us-west-2.amazonaws.com/openai-assets/research-covers/language-unsupervised/language_understanding_paper.pdf, Technical report, OpenAI, Jun. 11, 2018, 12 pages.

Shan, et al., "Deep Crossing: Web-Scale Modeling without Manually Crafted Combinatorial Features," in KDD '16: Proceedings of the 22nd ACM SIGKDD International Conference on Knowledge Discovery and Data Mining, Aug. 2016, pp. 255-262.

Shen, et al., "Learning Semantic Representations Using Convolutional Neural Networks for Web Search," in WWW 14 Companion: Proceedings of the 23rd International Conference on World Wide Web, Apr. 2014, pp. 373-374.

Sun, et al., "Patient Knowledge Distillation for BERT Model Compression," arXiv:1908.09355v1 [cs.CL], Aug. 25, 2019, 10 pages.

Tang, et al., "Distilling Task-Specific Knowledge from BERT into Simple Neural Networks," arXiv:1903.12136v1 [cs.CL], Mar. 28, 2019, 8 pages.

Turc, et al., "Well-Read Students Learn Better: On the Importance of Pre-training Compact Models," arXiv:1908.08962v2, [cs.CL], Sep. 25, 2019, 13 pages.

Vaswani, et al., "Attention Is All You Need," in 31st Conference on Neural Information Processing Systems (NIPS 2017), 2017, 11 pages.

Wang, et al., "Query-Driven Iterated Neighborhood Graph Search for Large Scale Indexing," in MM '12: Proceedings of the 20th ACM international conference on Multimedia, Oct. 2012, pp. 179-188.

Wu, et al., "Google's Neural Machine Translation System: Bridging the Gap between Human and Machine Translation," arXiv:1609.08144v2 [cs.CL], Oct. 8, 2016, 23 pages.

Yang, et al., "XLNet: Generalized Autoregressive Pretraining for Language Understanding," arXiv:1906.08237v2 [cs.CL], Jan. 2, 2020, 18 pages.

Yang, et al., "Model Compression with Multi-Task Knowledge Distillation for Web-scale Question Answering System," arXiv:1904.09636v1 [cs.CL], Apr. 21, 2019, 9 pages.

You, et al., "Large Batch Optimization for Deep Learning: Training BERT in 76 Minutes," arXiv:1904.00962v5 [cs.LG], Jan. 3, 2020, 2020, 37 pages.

Zhang, et al., "ERNIE: Enhanced Language Representation with Informative Entities," arXiv:1905.07129v3 [cs.CL], Jun. 4, 2019, 11 pages.

Zhu, et al., "PANLP at MEDIQA 2019: Pre-trained Language Models, Transfer Learning and Knowledge Distillation," in Proceedings of the 18th BioNLP Workshop and Shared Task, Aug. 2019, pp. 380-388.

(56) References Cited

OTHER PUBLICATIONS

Li, et al., "Approximate Nearest Neighbor Search on High Dimension Data—Experiments, Analyses, and Improvement," arXiv:1610.02455v1 [cs.DB], Oct. 8, 2016, 26 pages.

Te, Kasim, "How does temperature affect softmax in machine learning?", available at http://www.kasimte.com/2020/02/14/how-does-temperature-affect-softmax-in-machine-learning.html#:~:text=Temperature%20is%20a%20hyperparameter%20which,makes%20the%20model%20less%20confident, Feb. 14, 2020, 5 pages.

Chang, et al., "Pre-training Tasks for Embedding-based Large-scale Retrieval," arXiv library, aXiv:2002.03932v1 [cs.LG], Feb. 10, 2020, 12 pages.

Reimers, et al., "Sentence-BERT: Sentence Embeddings using Siamese BERT-Networks," arXiv library, arXiv:1908.10084v1 [cs.CL], Aug. 27, 2019, 11 pages.

Sanh, et al., "DistilBERT, a distilled version of BERT: smaller, faster, cheaper and lighter," arXiv library, arXiv:1910.01108v4 [cs.CL], Mar. 1, 2020, 5 pages.

Yang, et al., "Beyond 512 Tokens: Siamese Multi-depth Transformer-based Hierarchical Encoder for Long-Form Document Matching," arXiv library, arXiv:2004.12297v2 [cs.IR], Oct. 13, 2020, 10 pages.

Yang, et al., "Beyond 512 Tokens: Siamese Multi-depth Transformer-based Hierarchical Encoder for Long-Form Document Matching," in CIKM '20: Proceedings of the 29th ACM International Conference on Information & Knowledge Management, Oct. 2020, pp. 1725-1734.

Barkan, et al., "Scalable Attentive Sentence-Pair Modeling via Distilled Sentence Embedding," arXiv library, arXiv:1908.05161, Nov. 21, 2019, 8 pages.

Lu, et al., "TwinBERT: Distilling Knowledge to Twin-Structured Compressed BERT Models for Large-Scale Retrieval," in CIKM '20: Proceedings of the 29th ACM International Conference on Information & Knowledge Management, Oct. 2020, pp. 2645-2652.

\* cited by examiner

US 11,461,415 B2

ASSESSING SEMANTIC SIMILARITY USING A DUAL-ENCODER NEURAL NETWORK

BACKGROUND

Developers are producing machine-trained models of increasing sophistication and accuracy for use in interpreting linguistic expressions (e.g., search queries, documents, questions presented to conversational BOTs, etc.). However, some of these models are also relatively complex. For instance, in the case of neural networks, the models may include a relatively large number of layers and a relatively large number of machine-trained parameter values. This complexity introduces various challenges. For example, a developer may conclude that a complex model is too slow to deliver output results in a required amount of time. This factor is particularly acute in search engines; here, a developer may aspire to provide search results to a user within a fraction of a second. In other cases, a developer may conclude that a model is too resource intensive to implement on some user computing devices or platforms.

SUMMARY

A technique is described herein for processing a given query item in a latency-efficient and resource-efficient manner. The technique uses a first transformer-based encoder to transform the given query item into an encoded query item. In one case, the given query item is a linguistic expression that includes one or more query-expression linguistic tokens. The technique includes a second transformer-based encoder for transforming a given target item into an encoded target item. The given target item may likewise correspond to a linguistic expression that includes one or more target-expression linguistic tokens. A similarity-assessing mechanism then assesses the semantic similarity between the given query item and the given target item based on the encoded query item and the encoded target item.

In one implementation, each encoder includes at least one transformation unit. Each transformation unit, in turn, includes at least a self-attention mechanism that is configured to assess the intra-relevance of different parts of a given item, such as the relevance of each word in a given linguistic expression with respect to each other word in the given expression.

According to one implementation, the technique is efficient because each encoder processes a single given item (rather than a concatenation of both a given query item and a given target item). The technique can further expedite the comparison of the given query item and the given target item by computing the encoded target item in an offline manner, prior to receipt of the given query item.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 also shows how a self-attention mechanism used in a transformer-based encoder interprets each linguistic token in the given expression.

Figure 1:
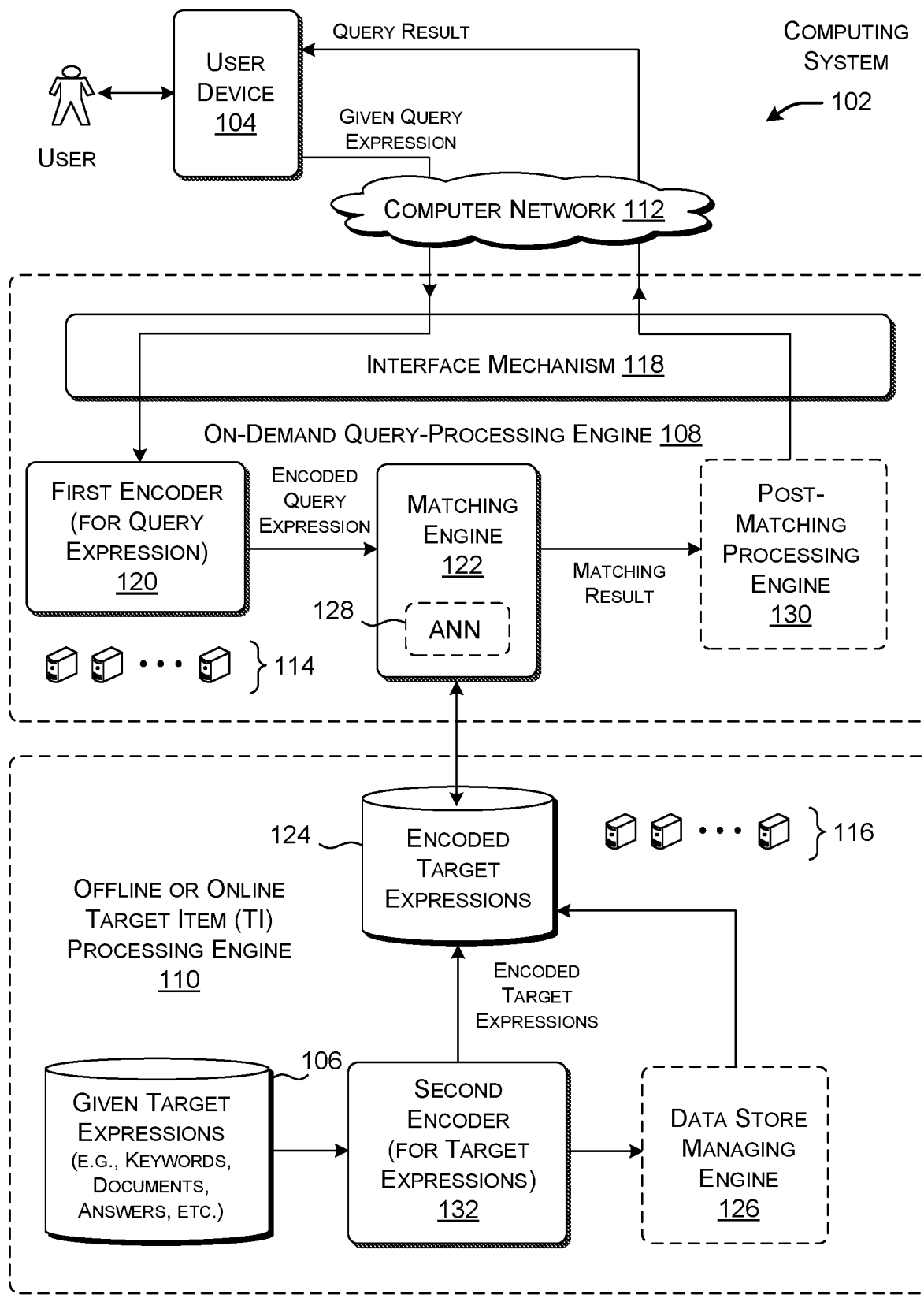
FIG. 1 shows an illustrative computing system that determines the semantic similarity between two given items (e.g., two linguistic expressions) using a dual-encoder neural network.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for processing a given item using a dual-encoder neural network. Section B sets forth an illustrative method that explains the operation of the computing system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "engine," "mechanism," and "component" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing System

A.1. Overview of the Computing System

FIG. 1 shows a computing system 102 that makes use of dual-encoder neural network for determining the semantic similarity between a pair of items. In most of the examples presented below, the items correspond to linguistic expressions. Each linguistic expression, in turn, may include one or more linguistic tokens, such as one or more words, one or more character n-grams, etc. In the terminology used herein, a pair of linguistic expressions includes a given query expression and a given target expression.

In one use scenario, the given query expression corresponds to a search query submitted by a user. The given target expression may correspond to a document under consideration. In another scenario, the given query expression again corresponds to a search query submitted by the user. The given target expression corresponds to a key phrase under consideration, which, in turn, is associated with a digital advertisement. In another scenario, the given query expression corresponds to a question posed by the user to an automated agent (e.g., a conversational BOT). Here, the target expression corresponds to a question under consideration that may be provided by the BOT. These are merely examples; still other interpretations of the terms "given query expression" and "given target expression" are possible.

In yet other examples, the computing system 102 can be used to determine the semantic similarity between pairs of other kinds of items, not limited to linguistic expressions. For example, the computing system 102 can be used to determine the semantic similarity between a first given image and a second given image. The different parts of a given image may correspond to identified objects or regions within the image. However, to simplify the following explanation, most of the examples described below will be framed in the context in which the given items being compared correspond to linguistic expressions. It should be understood that any mention of a "given query expression" more generally applies to a "given query item," and any mention of a "given target expression" more generally applies to a "given target item."

In many examples, the user interacts with a user computing device 104 to submit the given query expression. The computing system 102 may store one or more candidate target expressions in a data store 106. The data store 106 may correspond to a single data store or a distributed collection of data stores. Alternatively, or in addition, the user computing device 104 and/or other component of the computing system 102 automatically supplies information that serves as at least part of a query expression. For example, the computing system 102 can add location information and/or time information to the user's query expression. In another example, the user can interact with a document via the user computing device 104, which serves as a given query expression; here, the computing system 102 may attempt to find another document that matches the given query expression. Still other query input scenarios are possible.

In one implementation, the computing system 102 includes an on-demand query-processing engine ("query-processing engine") 108 and a target expression processing engine ("TI-processing engine") 110. The query-processing engine 108 performs real-time processing of a given query expression that is supplied by the user or otherwise presented to the query-processing engine 108. The TI-processing engine 110 performs offline processing of a collection of target expressions in the data store 106. That is, the TI-processing engine 110 can process the target expressions as a background task prior to the point in time at which the user submits a particular query expression. But the computing system 102 can also perform any operation that is described herein as an offline background task in an on-demand (real-time) manner, that is, in response to the user's submission of a query expression or other triggering event.

The computing system 102 can implement the query-processing engine 108 using one or more servers 114. Likewise, the computing system 102 can implement the TI-processing engine 110 using one or more servers 116. The two sets of servers (114, 116) can be entirely distinct. Alternatively, at least some of the servers can perform the functions of both the query-processing engine 108 and the TI-processing engine 110.

The user computing device 104 can interact with the query-processing system 108 via a computer network 112. The computer network 112 can correspond to a wide area network (e.g., the Internet), a local area network, one or more point-to-point links, etc., or any combination thereof. The user computing device 104 itself may correspond to any type of apparatus that performs a computing function, such as a desktop personal computing device, a laptop computing device, any type of handheld computing device, a wearable computing device, a mixed-reality device, a game console, and so on.

Referring first to the query-processing engine 108, an interface mechanism 118 receives a given query expression from the user computing device 104 (and/or from any other source). The interface mechanism 118 also formulates and transmits query results to the user computing device 104. The query results may include information regarding one or more target expressions that match the given query expression. Alternatively, or in addition, the query results can include the target expression(s) themselves. In one context, for example, the query results can include a set of snippets that identify documents that match the given query expression. In another context, the query results can include a least one digital advertisement having a key phrase that matches the given query expression. In another context, the query results can include an answer to a given query expression provided by a conversational BOT, and so on. The interface mechanism 118 itself may correspond to a frontend software layer that the query-processing engine 108 uses to interact with users.

A first encoder 120 maps a given query expression into an encoded query expression. As will be described in connection with FIG. 2, the first encoder 120 corresponds to a multi-layer neural network that includes at least one self-attention mechanism and at least one feed-forward neural network. These are components also found in neural networks referred to in the technical literature as "transformers," e.g., as described in Devlin, et al., "BERT: Pre-training of Deep Bidirectional Transformers for Language Understanding," arXiv:1810.04805v2 [cs.CL], May 24, 2019, 16 pages, and VASWANI, et al., "Attention Is All You Need," arXiv:1706.03762v5 [cs.CL], Dec. 6, 2017, 15 pages. For this reason, the first encoder 120 can also be generally described as a transformer-based encoder. However, as will also be clarified below in connection with the explanation of FIG. 2, the computing system 102 uses a novel dual-encoder framework that is not set forth in the above-noted technical literature. Further, each individual encoder used by the computing system 102 includes modifications that are not set forth in the above-noted technical literature.

A matching engine 122 identifies at least one (if any) target expression that matches a given query expression, to produce a matching result. The matching engine 122 performs this task using a similarity-assessing mechanism (not shown in FIG. 1). As will be described below, the similarity-assessing mechanism operates by comparing an encoded query expression (associated with a given query expression) with an encoded target expression (associated with a given target expression under consideration). For example, as will be described below, the similarity-assessing mechanism can use a cosine similarity metric to determine the distance in semantic space between these two encoded expressions. Or the similarity-assessing mechanism can generate an elementwise maximum of the two encoded expressions, and then use a residual function (described below) to compute a similarity score. In some implementations, the matching engine 122 determines that a given query expression matches a given target expression if the similarity score produced by the similarity-assessing mechanism satisfies a prescribed threshold value.

In one application context, the matching engine 122 is tasked with the responsibility of determining whether a specific given query expression matches a single specific given target expression, with respect to any environment-specific threshold value that determines what constitutes a match. Here, the matching engine 122 uses the similarity-assessing mechanism to compute a single similarity score, and then compares that single score with the appropriate threshold value.

In another application context, the matching engine 122 is used to find one or more target expressions that are the closest matches to a given query expression. Here, the matching engine 122 can use various search algorithms to find the best-matching target expression(s). For example, in one implementation, assume that the TI-processing engine 110 includes a data store 124 that provides precomputed encoded target expressions associated with respective given target expressions. The matching engine 122 can use the similarity-scoring mechanism to successively compare the encoded query expression (associated with the given query expression) with each precomputed encoded target expression. The matching engine 122 can select the n target expressions having the best similarity scores.

In other cases, a data store managing engine ("managing engine") 126 organizes encoded target expressions in the data store 124 in a data structure, such as a hierarchical data structure, a graph, etc. The matching engine 122 can then use any type of search strategy to explore the data structure in a structured manner. This enables the matching engine 122 to retrieve relevant encoded target expressions in less time than the first-mentioned technique described above, which involves successively comparing the encoded query expression with each encoded target expression in the data store 124.

For example, the matching engine 122 can use an approximate nearest neighbor (ANN) mechanism 128 to find encoded target expressions that are close to a given encoded query expression in semantic space. Examples of ANN techniques include: various kinds of locality-sensitive hashing (LSH) techniques; various tree partition techniques; various neighborhood-based techniques, and so on. To cite merely one example, the managing engine 126 can use the k-means clustering technique to partition encoded target expressions into successively smaller regions within a semantic space. The managing engine 126 then represents these clusters as a hierarchical tree. The ANN component 128 finds those encoded target expression that are closest to a given encoded query vector by traversing the tree from its root node to its leaf nodes. Background information regarding the general topic of ANN, as applied to general datasets, can be found in Wen Li, et al., "Approximate Nearest Neighbor Search on High Dimension Data—Experiments, Analyses, and Improvement," arXiv:1610.02455v1 [cs.DB], Oct. 8, 2016, 26 pages.

A post-matching processing engine 130 generates query results based on the matching result provided by the matching engine 122. In doing so, the post-matching processing engine 130 can use one or more ranking components (not shown) to rank the matching target expressions identified by the matching engine 122. The ranking component(s) can take various factors into account in ranking the target expressions. For example, in assessing the relevance of a given target expression under consideration relative to a given query expression, the ranking component(s) can consider: the similarity score computed by the matching engine 122 for the given target expression; the lexical similarity between the given query expression and the given target expression; the empirical relation between the given query expression and the given target expression; a bidding amount associated with the given target expression (for the case in which the target expression in an advertising key phrase), and so on. The empirical relation between two linguistic expressions may be measured by determining the number of times that these two expressions co-occur in the behavior of one or more users. For example, the empirical relation between a query expression and a document may be measured by determining the number of times that users click on the document after submitting the query. The ranking component(s) can use one or more rules-based and/or machine-trained models to perform their ranking tasks.

The TI-processing engine 110 uses a second encoder 132 to convert each given target expression into an encoded target expression. The second encoder 132 uses the same transformer-based architecture as the first encoder 120. In one implementation, the second encoder 132 also uses the same set of machine-trained parameter values as the first encoder 120. Here, the first encoder 120 and the second encoder 132 may represent different instances of the same logic, or the first encoder 120 and the second encoder 132 may represent the same instance of logic that is used at different respective times to process the given query expression and the given target expression, respectively.

In another implementation, the second encoder 132 shares the same transformer-based architecture as the first encoder 120, but includes a set of machine-trained parameter values that differ at least in part from the set of machine-trained parameter values used by the first encoder 120. In this case, a training system optimizes the first encoder 120 for processing given query expressions and optimizes the second encoder 132 for processing given target expressions.

As further mentioned above, in one implementation, the second encoder 132 can perform its encoding operations in an offline operation, prior to the receipt of a given query expression. In another implementation, the second encoder 132 can operate in an on-demand manner, that is, in response to the submission of the given query expression. In the former case, the TI-processing engine 110 stores the pre-computed encoded target expressions in the data store 124. In some implementations, the information provided in the data store 124 represents part of a more encompassing index. That index describes the target expressions in the data store 106; as part of that description, the index can provide the encoded target expressions associated with those target expressions. In addition, or alternatively, the information provided in the data store 124 can be formulated as a data structure that can be efficiently explored by the ANN component 128. The managing engine 126 maintains that data structure.

A.2. Dual-Encoder Neural Network

Figure 2:
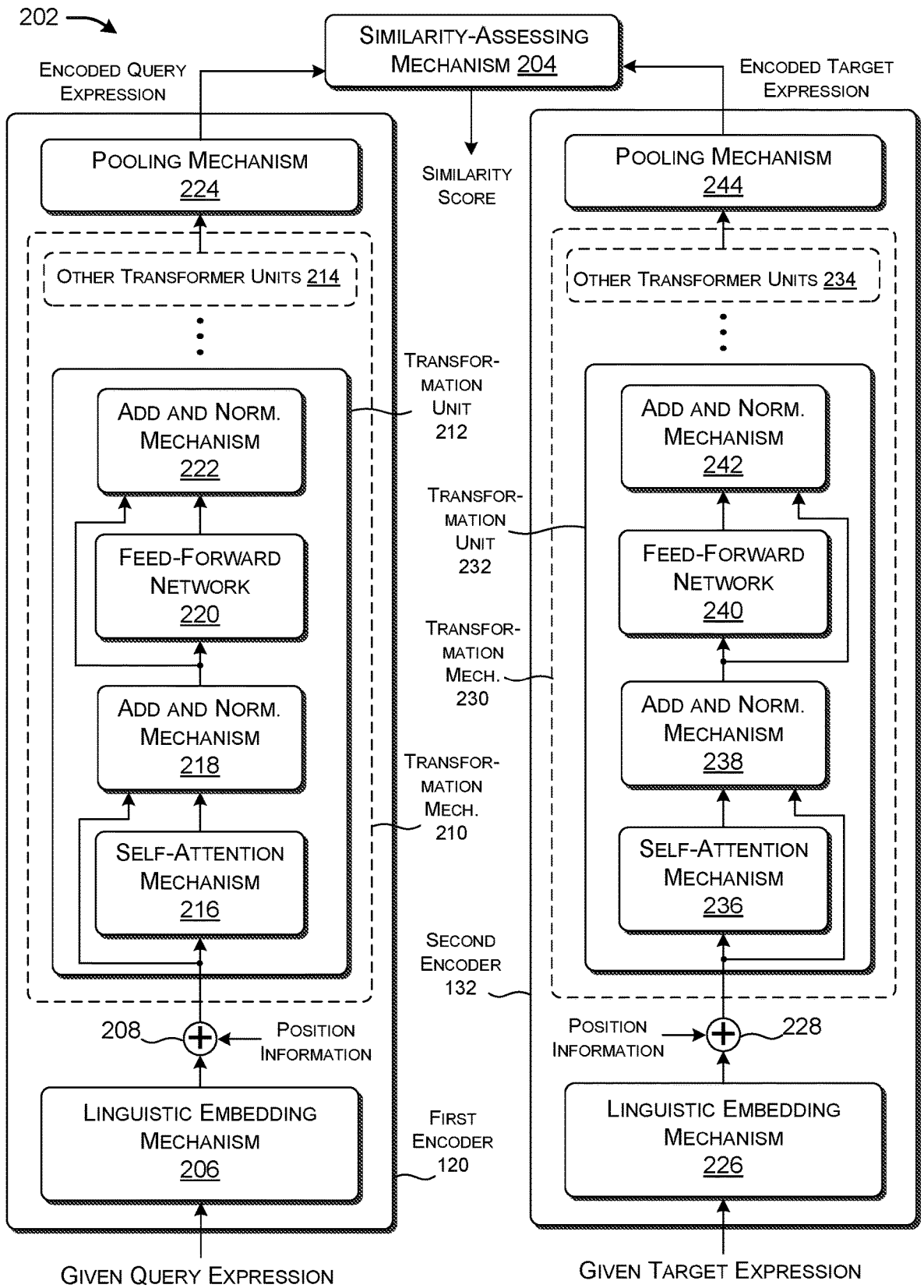
FIG. 2 shows one implementation of a dual-encoder neural network for use in the computing system of FIG. 1.

FIG. 2 shows a dual-encoder neural network 202 that is used by the computing system 102 of FIG. 1. The dual-encoder neural network 202 includes the above-described first encoder 120 and the second encoder 132. The first encoder 120 maps a given query expression into an encoded query expression, while the second encoder 132 maps a given target expression into an encoded target expression. A similarity-assessing mechanism 204 determines the semantic similarity between the given query expression and the given target expression based on the encoded query expression and the encoded target expression, to provide a similarity score. In the context of FIG. 1, the matching engine 122 can include or otherwise make use of the similarity-assessing mechanism 204.

The dual-encoder neural network 202 shown in FIG. 2 differs from previous known transformer-based designs in various ways. According to one distinction, the dual-encoder neural network 202 allocates the task of comparing two linguistic expressions to three principal components: the first encoder 120 (which processes the given query expression), the second encoder 132 (which processes the given target expression), and the similarity-assessing mechanism 304 (which makes a determination of the semantic similarity between the given query expression and the given target expression). Previous transformer-based designs use a single neural network to process a pair of linguistic items. For instance, previous transformer-based designs concatenate a first linguistic expression and a second linguistic expression to produce a joint input expression. The previous transformer-based designs then use a single multi-level neural network to generate an output conclusion based on the joint input linguistic expression.

The dual-encoder neural network 202 shown in FIG. 2 can more efficiently performs its task compared to a single-chain neural network because each of its encoders works on a less complex input expression, compared to the joint input expression described above. Further, each of the encoders in the dual-encoder neural network 202 performs fewer operations compared to a single-chain neural network. Further still, the second encoder 132 can operate in an offline fashion, prior to the receipt of the given query expression. In this scenario, the computing system 102 can expedite the comparison of the given query expression with the given target expression because the task of the second encoder 132 has already been performed. In other cases, the computing system 102 runs both of the encoders (120, 132) at the same time in an on-demand manner. But even this case can be performed in an efficient manner because these two encoders (120, 132) can operate in parallel. Still other merits of the dual-encoder neural network 202 over a single-chain neural network are set forth below.

As noted above, in one implementation, the first encoder 120 and the second encoder 132 have the same architecture, e.g., by including the same subcomponents and the same organization of those subcomponents. In some implementations, the encoders (120, 132) also use the same set of weighting values. In other cases, the encoders (120, 132) use different respective sets of weighting values. In view of this design, the explanation that follows will primarily focus on the construction and operation of the first encoder 120. This explanation applies with equal force to the construction and operation of the second encoder 312.

Starting at the bottom of FIG. 2, a linguistic embedding mechanism 206 transforms the tokens in the given query expression into a set of input embeddings, also referred to herein as input vectors. The linguistic embedding mechanism 206 can use different techniques to perform this task. In one approach, the linguistic embedding mechanism 206 can convert each word in the given query expression into a character n-gram representation. For example, consider the example in the first word in the given query expression is "hybrid," and n=3, the linguistic embedding mechanism 206 moves a three-character window across the word "hybrid" to produce an input embedding having entries for the tri-gram dimensions for "hyb," "ybr," "bri," and "rid". That is, the linguistic embedding mechanism 206 can produce an input vector having a number of dimensions equal to all possible tri-grams in a language, with "1" entries in those dimensions associated with "hyb," "ybr," "bri," and "rid," and "0" entries in other dimensions. Note that the above-cited transformer-related literature does not describe the use of character-trigrams in the input layer.

The linguistic embedding mechanism 206 can also optionally add a special classification token "[cls]" to the beginning of the series of input embeddings. As will be described, a last-stage pooling mechanism can optional use the encoded counterpart of the classification token to perform a pooling operation.

Next, an adding mechanism 208 adds position information to each input embedding. The position information describes the position of a token (associated with a particular input embedding) in the series of tokens that make up the given query expression. For example, assume that the given query expression reads "hybrid Ford hatchback 2020." The adding mechanism 208 will add position information to the input embedding associated with "hybrid" that indicates that the word "hybrid" is the first token in the given query expression. Overall, the first encoder 120 adds position information to the input embeddings to inform its self-attention mechanisms (described below) of the positional context of each token under consideration within a given query expression. A neural network that uses convolution or recurrence does not require the use of an adding mechanism because the operations of convolution and recurrence inherently capture position information. The adding mechanism 208 is used in the dual-encoder neural network 202 because, according to one implementation, the dual-encoder neural network 202 does not include layers devoted to recurrence or convolution.

The adding mechanism 208 can encode position information in different ways, such as by using one or more sinusoidal functions to map the index of a token into position information, or by using a machine-trained function to map the index of the token into position information. Overall, the adding mechanism 208 produces position-modified embeddings. In one non-limiting implementation, each embedding has a dimension of 512.

A transformation mechanism 210 next maps the set of position-modified embeddings into transformer output vectors. The transformation mechanism 210, in turn, includes a chain of one or more transformation units, including representative transformation unit 212 and one or more other transformation units 214. The representative transformation unit 212 includes a series of layers, including a self-attention mechanism 216, an add-and-normalize mechanism 218, a feed-forward neural network 220, and another add-and-normalize mechanism 222.

Figure 3:
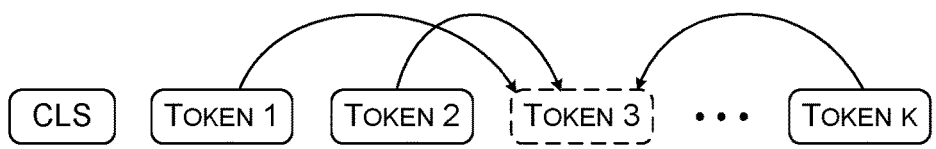
FIG. 3 shows a series of linguistic tokens included in a given expression.

Jumping ahead momentary in the sequence of figures, FIG. 3 provides a high-level conceptual overview of the operation of the self-attention mechanism 216, corresponding to the first layer in the first transformation unit 212. As shown there, assume that the given input expression includes a set of linguistic tokens, optionally with a preceding classification token "[cls]". In processing each particular word in the given query expression, the self-attention mechanism 216 takes into the consideration the relevance of each other word in the given query expression on that particular word. For example, assume that the given query expression reads "What is the median sales price of houses in the city of Billings, MT?" In processing the word "Billings," the self-attention mechanism 216 may determine that the tokens "city" and "MT" are most useful in correctly disambiguating the term "Billing," e.g., because these contextual terms strongly suggest that "Billings" refers to a physical place rather than a financial term.

Figure 4:
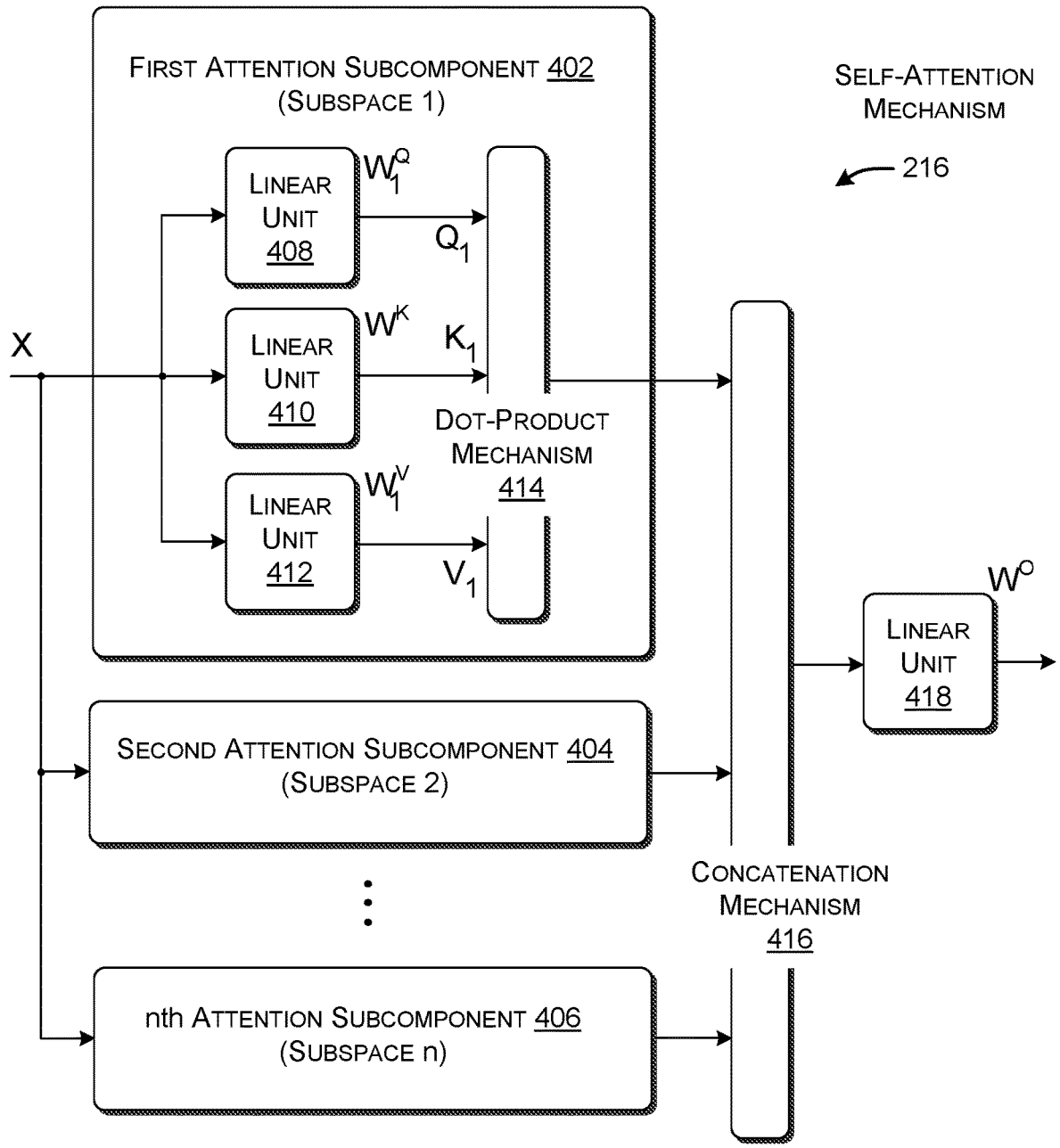
FIG. 4 shows one implementation of a self-attention mechanism for use in a transformer-based encoder.

FIG. 4 shows one implementation of the self-attention mechanism 216 provided the first transformation unit 212 (of FIG. 2). The self-attention mechanism 216 is referred to as a multi-head attention mechanism because it includes attention subcomponents associated with different respective representation subspaces. A first attention subcomponent 402 performs analysis with respect to a first representation subspace, a second attention subcomponent 404 performs analysis with respect to a second representation subspace, and an $n^{th}$ attention subcomponent 406 performs analysis with respect to an $n^{th}$ representation subspace. In one non-limiting implementation, the self-attention mechanism 216 includes eight such attention subcomponents.

Consider the first attention subcomponent 402 associated with representation subspace 1. The other attention subcomponents operate in the same manner as the first attention subcomponent 402 with respect to their respective subspaces. Assume that the first encoder 120 packages the position-modified embeddings into a single matrix X. This same matrix X serves as input to three linear units (408, 410, 412), where it is respectively interpreted as a query-related input (Q), a key-related input (K), and a value-related input (V). The first linear unit 408 projects the matrix X using a first machine-trained weighting matrix $W_1^Q$ to produce a first matrix $Q_1$. The subscript of "1" denotes the first subspace. Each query in $Q_1$ has a dimension of $d_k$, where the dimension $d_k$ is less than the dimension of the position-modified embeddings in X. The second linear unit 410 modifies the matrix X by a second machine-trained matrix $W_1^K$ to produce a second (key) matrix $K_1$, with each key in $K_1$ also having a dimension of $d_k$. The third linear unit 412 modifies the matrix X by a third machine-trained matrix $W_1^V$ to produce a third matrix $V_1$, with each value in $V_1$ having a dimension of $d_v$.

A dot-product mechanism 414 next generates the dot product $Q_1 K_1^T$ and then divides that product by $\sqrt{d_k}$ to produce a quotient, where $d_k$ is again the dimension of the queries and keys in $Q_1$ and $K_1$, respectively. The dot-product mechanism 414 next generates the softmax of the quotient, and then multiples the result of the softmax by $V_1$. Altogether, the first attention subcomponent 402 performs the operation described in the following equation:

$$\text{Attention}(Q_1, K_1, V_1) = \text{softmax}\left(\frac{Q_1 K_1^T}{\sqrt{d_k}}\right) V_1.$$

A concatenation mechanism 416 concatenates the outputs of the individual attention subcomponents (402, 404, . . . , 406). A linear unit 418 projects the output of the concatenation mechanism 416 using another machine-trained matrix $W^O$, restoring the vectors in the resultant product to the same dimension as the vectors in X.

Returning to FIG. 2, the add-and-normalize mechanism 218 adds the input to the self-attention mechanism (i.e., the position-modified input embeddings) to the output result of the self-attention mechanism 216, and then performs layer-normalization on that sum. In one implementation, the add-and-normalize mechanism 218 normalizes the sum by computing the mean ($\mu$) and standard deviation ($\sigma$) of the individual elements that make up the sum. The add-and-normalize mechanism 218 then adjusts each element $x_i$ in the sum based on the mean and standard deviation, e.g., to produce $x_i' = (x_i - \mu)/(\sigma - \epsilon)$, where $\epsilon$ is an empirically-chosen constant.

The feed-forward network 220 uses a fully-connected (FC) feed-forward neural network having any number of layers to transform the output of the add-and-normalize mechanism 218 into an output result. In one implementation, the feed-forward network 220 can use linear transformations interspersed with activations (e.g., ReLu activations). Finally, another add-and-normalize mechanism 222 adds the input that is fed to feed-forward network 220 to the output result of the feed-forward network 220, and then normalizes that sum.

Although not shown, each of the other transformation units 214 includes the same subcomponents as the representative transformation unit 212. These other transformation units likewise operate in the same manner as the representative transformation unit 212. Each transformation unit that follows the representative transformation unit 212 receives input that corresponds to the output result of the preceding transformation unit in the chain of transformation units. In one non-limiting implementation, the first encoder 120 includes six such transformation units. The transformation mechanism 210 as a whole produces a set of transformer output vectors that correspond to encoded counterparts of the tokens in the given query expression.

A pooling mechanism 224 compresses the set of transformer output vectors received from the transformation mechanism 210 into a single output vector, which constitutes the final output result of the first encoder 120, and which is also referred to herein as the encoded query expression or query output vector. The pooling mechanism 224 can perform this operation in different ways. In one case, the pooling mechanism 224 can compute an average of the elements in the transformer output vectors. For example, to produce the first element in the single output vector, the pooling mechanism 224 can compute a sum of the first elements in the transformer output vectors and then divide that sum by the number of transformer output vectors. In another implementation, the pooling mechanism 224 can generate a weighted average of the elements in the transformer output vectors. The pooling mechanism 224 performs this task by multiplying each element average (described above) by a machine-learned weighting value. In one implementation, each element of a particular transformer output vector (associated with a word in the given query expression) is given the same weight value.

In another implementation, the pooling mechanism 224 can use the encoded counterpart of the [CLS] token as the single output vector. More specifically, recall that the linguistic embedding mechanism 206 appended the classification token [CLS] to the beginning of the series of linguistic tokens. The first transformer output vector produced by the transformation mechanism 210 represents the encoded counterpart of that classification token. The pooling mechanism 224 can accept that encoded vector as the single output vector. In whatever way that the pooling mechanism 224 is implemented, note that this component is a modification to the encoder design described in the above-cited transformer-based literature, and is not disclosed in that literature.

The second encoder 132 includes the same subcomponents as the first encoder 120, including a linguistic embedding mechanism 226, an adding mechanism 228, and a transformation mechanism 230 that is composed of a representative transformation unit 232 and one or more other transformation units 234. The representative transformation unit 232 includes a self-attention mechanism 236, an add-and-normalize mechanism 238, a feed-forward network 240, and another add-and-normalize mechanism 242. A pooling mechanism 244 operates on the transformer output vectors produced by the transformation mechanism 230 to produce a single target output vector, also referred to herein as the encoded target expression.

The similarity-assessing mechanism 204 can use different strategies to determine the semantic similarity between the encoded query expression and the encoded target expression. In a first approach, the similarity-assessing mechanism 204 uses a cosine similarity metric to determine the semantic relation between the two encoded expressions. Generally, the cosine similarity between two vectors A and B corresponds to $(A \cdot B)/(\|A\|\|B\|)$.

In another implementation, the similarity-assessing mechanism 204 uses a max operator to compute the elementwise maximum of the encoded query expression and the encoded target expression, to yield an output vector x. For example, to determine the first element of this elementwise maximum, the similarity-assessing mechanism 204 chooses the value that appears in the first element of the encoded query expression or the value that appears in the first element of the encoded target expression, whichever is larger. The similarity-assessing mechanism 204 can then compute a value y such that $y=f(x, W, b)+x$, where $f(\cdot)$ is a mapping function, and W and b are machine-trained parameter values. In other word y−x may be viewed as a residual, and $f(\cdot)$ can be said to map x to the residual. In whatever way that the similarity-assessing mechanism 204 is implemented, note that this component is a modification to the encoder design described in the above-cited transformer-based literature, and is not disclosed in that literature.

The dual-encoder neural network 202 was described above in the context of the processing of a pair of linguistic expressions. But the same dual-encoder architecture can be used to process pairs of other types of items, such as pairs of images. In that context, an initial embedding mechanism of an encoder can associate vectors with objects or regions that appear in a given image. The self-attention mechanism(s) of the encoder can then determine the relevance of each object or region in an image relative to every other object or region in the image.

A.3. Training Framework

Figure 5:
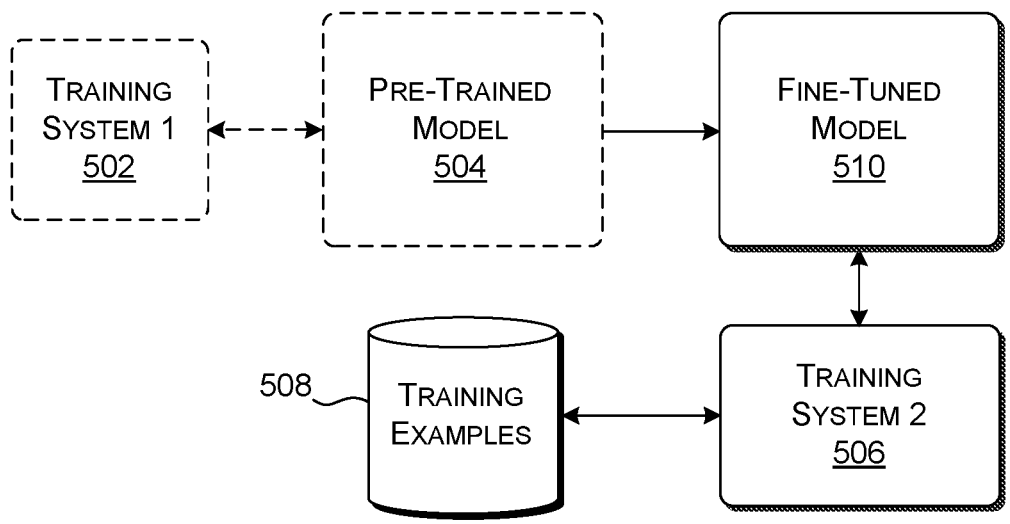
FIG. 5 shows a framework for fine-tuning a pre-trained model to produce a fine-tuned teacher model.
Figure 6:
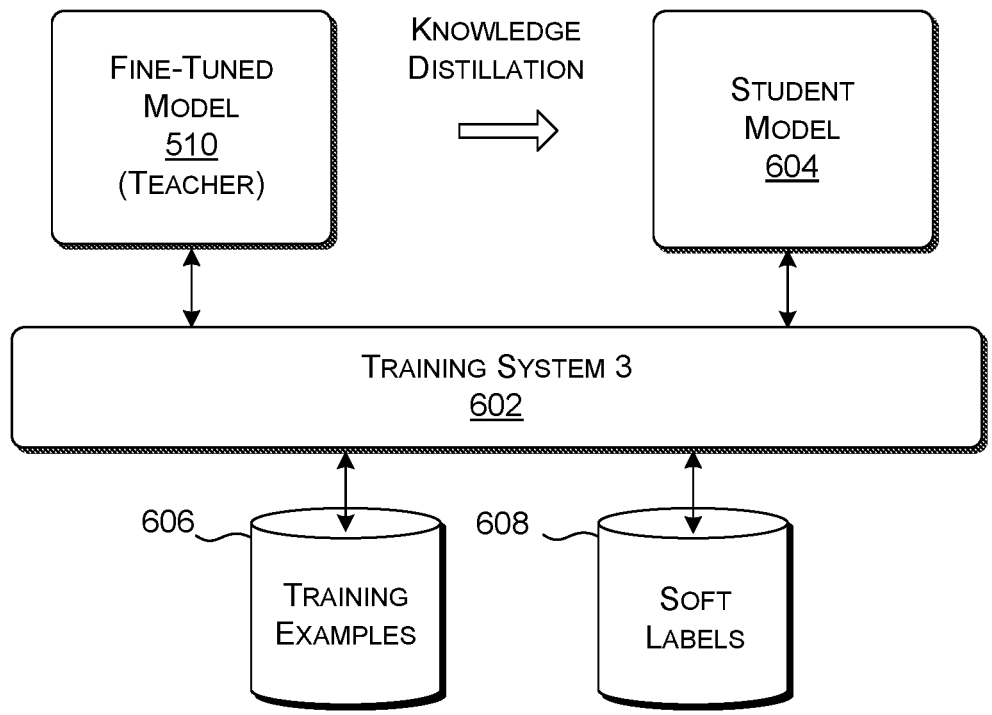
FIG. 6 shows a framework for using the fine-tuned teacher model to train a student model. The student model, in turn, defines the parameter values used by the dual-encoder neural network of FIG. 2.

FIG. 5 shows a framework for producing a fine-tuned model. FIG. 6 shows a framework for using the fine-tuned model as a teacher model to train a student model. The student model, in turn, provides the machine-trained values used by the dual-encoder neural network 202 described above.

Starting with FIG. 5, a first training system 502 produces a pre-trained model 504. For example, in the case of the BERT model described by the above-cited Devlin, et al. paper, the first training system 502 can train a BERT model to perform two tasks. In a first task, the training system 502 trains the BERT model to predict the identity of a word that has been omitted in an input training example. In a second task, the first training system 502 trains the BERT model to predict, given two sentences, whether the second sentence properly follows the first sentence. The resultant pre-trained model 504 may be considered general-purpose in nature because it can be further trained or fine-tuned to perform different tasks. More specifically, a subsequent training operation fine tunes the pre-trained model 504 by further modifying its parameter values, such that the resultant fine-tuned model performs a desired task.

In the example of FIG. 5, a second training system 506 trains the pre-trained model 504 based on a corpus of training examples in a data store 508. The training examples include a set of positive examples, corresponding to pairs of query expressions and target expressions that are considered to respectively match, and a set of negative examples, corresponding to pairs of query expressions and target expressions that are not considered to match. The second training system 506 fine-tunes the pre-trained model 504 such that the resultant model can successfully determine the semantic relation between any given query expression and target expression. The second training system 506 can perform its training using any technique, such as stochastic gradient descent. As a result of its training, the second training system 506 produces a fine-tuned model 510. Note that, however, at this stage, the fine-tuned model 510 is a single-chain BERT-derived model that simulates the output results of the dual-encoder neural network 202; the fine-tuned model 510 does not provide weighting values for use in the actual model that underlies the dual-encoder neural network 202 of FIG. 2.

Advancing to FIG. 6, a third training system 602 uses the fine-tuned model 510 as a teacher model to train a student model 604. In this operation, training examples in a data store 606 of training examples are fed to both the fine-tuned (teacher) model 510 and the student model 604 being trained. The fine-tuned (teacher) model 510 generates a soft label $y_i$ that is considered authoritative, and is given by:

$$y_i = \frac{\exp(z_i/T)}{\Sigma_j \exp(z_j/T)}.$$

In this equation, z corresponds to the logits provided by the fine-tuned model 510, and T is a temperature parameter that governs the "softness" of the label. Increasing the value of T increases the amount of information provided by a soft label. When T is set to 1, the above equation reduces to a softmax function. A data store 608 stores the soft labels.

The third training system 602 trains the student model 604 based on a cross-entropy loss function for binary classification, as given by:

$$\text{loss} = -\sum_{i=1}^{N} (y_i \log(p_i) + (1-y_i)\log(1-p_i)).$$

In this equation, N is the number of samples in the data store 606, and p is the probability predicted by the student model 604.

The training technique described above is presented in the spirit of illustration and not limitation; still other techniques can be used to train the dual-encoder neural network 202. For instance, a training system can directly produce a model for use by the dual-encoder neural network 202 from "scratch," that is, without the use of a teacher model. Such a training system can produce the model based on the same kind of training examples provided in the data store 508.

B. Illustrative Processes

Figure 7:
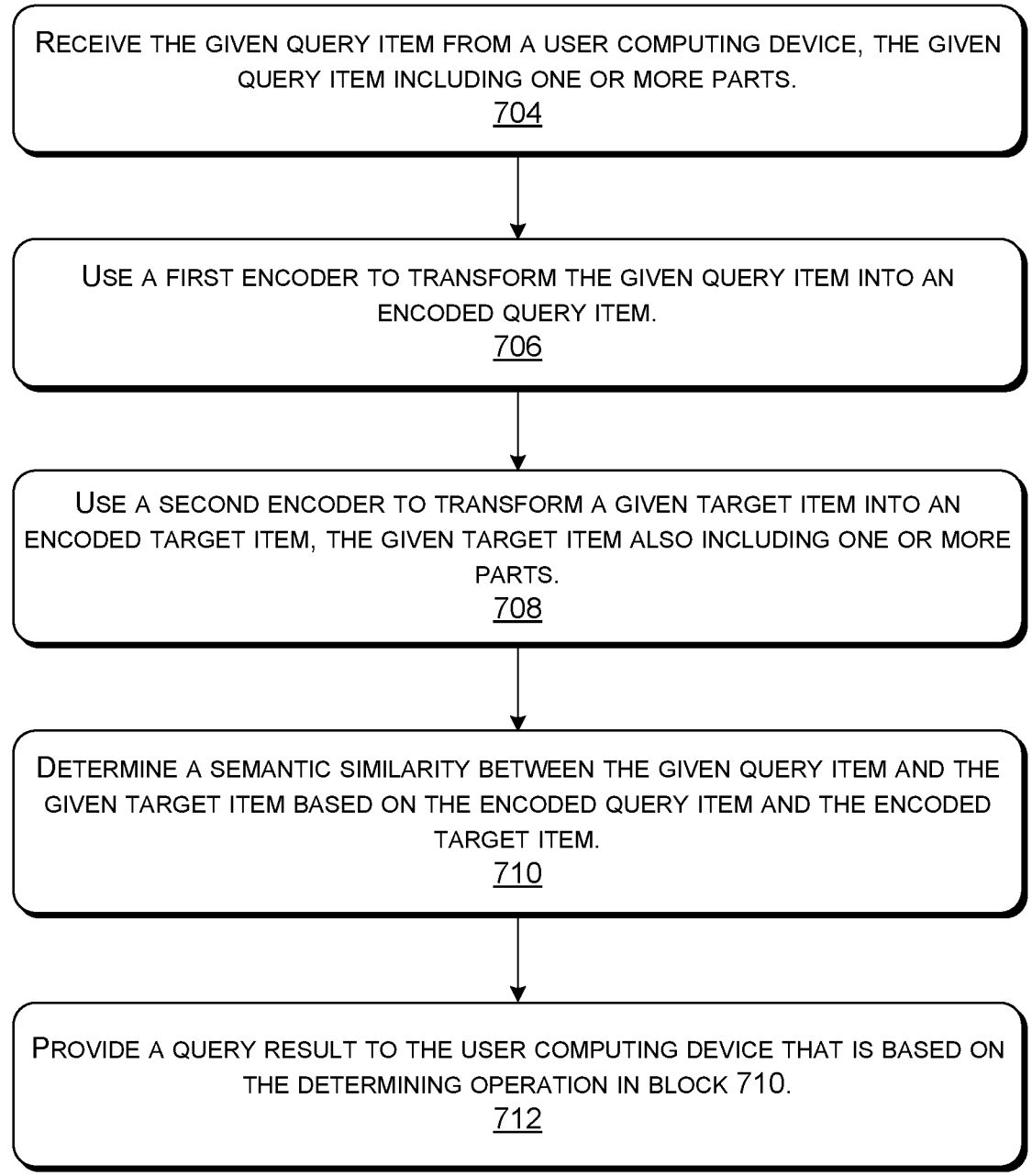
FIG. 7 is a flowchart that shows one illustrative manner of operation of computing system of FIG. 1.

FIG. 7 shows a process 702 that explains the operation of the computing system 102 of Section A in flowchart form. Since the principles underlying the operation of the computing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

In block 704, the interface mechanism 118 of the computing system 102 receives the given query item from the user computing device 104, the given query item including one or more parts. In block 706, the query-processing engine 108 uses the first encoder 120 to transform the given query item into an encoded query item. In block 708, the TI-processing engine 110 uses the second encoder 132 to transform a given target item into an encoded target item, the given target item also including one or more parts. In block 710, the matching engine 122 determines a semantic similarity between the given query item and the given target item based on the encoded query item and the encoded target item. In block 712, the interface mechanism 118 provides a query result to the user computing device 104 that is based on the operation of determining in block 710. Each of first encoder and the second encoder includes at least one transformation unit (e.g., transformation units 212 and 232). A transformation unit includes at least a self-attention mechanism (216, 236) that is configured to interpret each part under consideration in a given item by determining a relevance of each other part in the given item to the part under consideration.

C. Representative Computing Functionality

Figure 8:
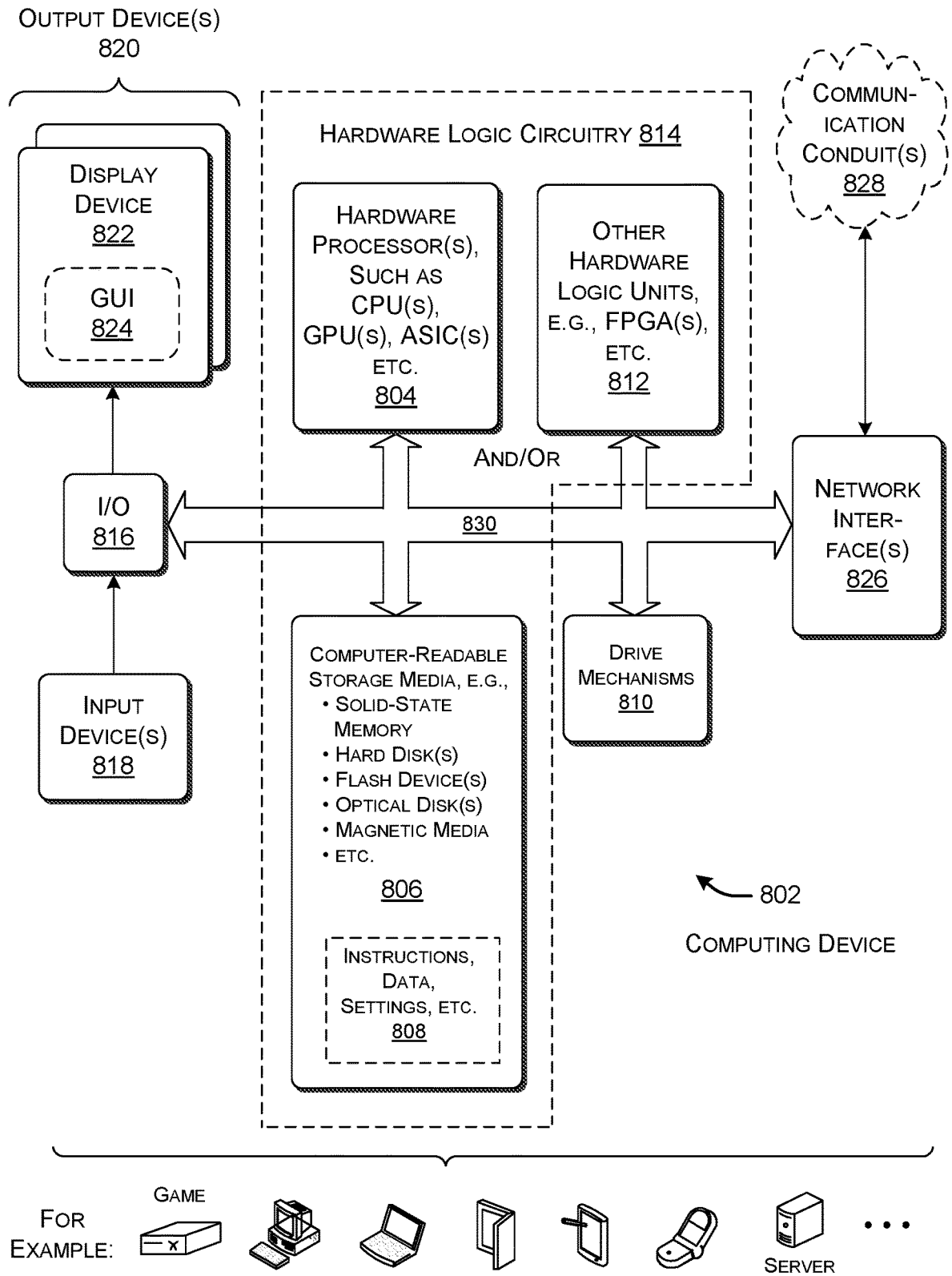
FIG. 8 shows an illustrative type of computing device that can be used to implement any aspect of the features shown in the foregoing drawings.

FIG. 8 shows a computing device 802 that can be used to implement any aspect of the mechanisms set forth in the above-described figures. For instance, with reference to FIG. 1, the type of computing device 802 shown in FIG. 8 can be used to implement any server associated with the query-processing engine 108, any server associated with the TI-processing engine 110, and any user computing device (e.g., user computing device 104). In the context of FIGS. 5 and 6, the computing device 802 shown in FIG. 8 can be used to implement any of the illustrated training systems. In all cases, the computing device 802 represents a physical and tangible processing mechanism.

The computing device 802 can include one or more hardware processors 804. The hardware processor(s) 804 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 802 can also include computer-readable storage media 806, corresponding to one or more computer-readable media hardware units. The computer-readable storage media 806 retains any kind of information 808, such as machine-readable instructions, settings, data, etc. Without limitation, for instance, the computer-readable storage media 806 may include one or more solid-state devices, one or more magnetic hard disks, one or more optical disks, magnetic tape, and so on. Any instance of the computer-readable storage media 806 can use any technology for storing and retrieving information. Further, any instance of the computer-readable storage media 806 may represent a fixed or removable unit of the computing device 802. Further, any instance of the computer-readable storage media 806 may provide volatile or non-volatile retention of information.

The computing device 802 can utilize any instance of the computer-readable storage media 806 in different ways. For example, any instance of the computer-readable storage media 806 may represent a hardware memory unit (such as Random Access Memory (RAM)) for storing transient information during execution of a program by the computing device 802, and/or a hardware storage unit (such as a hard disk) for retaining/archiving information on a more permanent basis. In the latter case, the computing device 802 also includes one or more drive mechanisms 810 (such as a hard drive mechanism) for storing and retrieving information from an instance of the computer-readable storage media 806.

The computing device 802 may perform any of the functions described above when the hardware processor(s) 804 carry out computer-readable instructions stored in any instance of the computer-readable storage media 806. For instance, the computing device 802 may carry out computer-readable instructions to perform each block of the process described in Section B.

Alternatively, or in addition, the computing device 802 may rely on one or more other hardware logic units 812 to perform operations using a task-specific collection of logic gates. For instance, the hardware logic unit(s) 812 may include a fixed configuration of hardware logic gates, e.g., that are created and set at the time of manufacture, and thereafter unalterable. Alternatively, or in addition, the other hardware logic unit(s) 812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 8 generally indicates that hardware logic circuitry 814 includes any combination of the hardware processor(s) 804, the computer-readable storage media 806, and/or the other hardware logic unit(s) 812. That is, the computing device 802 can employ any combination of the hardware processor(s) 804 that execute machine-readable instructions provided in the computer-readable storage media 806, and/ or one or more other hardware logic unit(s) 812 that perform operations using a fixed and/or programmable collection of hardware logic gates. More generally stated, the hardware logic circuitry 814 corresponds to one or more hardware logic units of any type(s) that perform operations based on logic stored in and/or otherwise embodied in the hardware logic unit(s).

In some cases (e.g., in the case in which the computing device 802 represents a user computing device), the computing device 802 also includes an input/output interface 816 for receiving various inputs (via input devices 818), and for providing various outputs (via output devices 820). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 822 and an associated graphical user interface presentation (GUI) 824. The display device 822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 802 can also include one or more network interfaces 826 for exchanging data with other devices via one or more communication conduits 828. One or more communication buses 830 communicatively couple the above-described units together.

The communication conduit(s) 828 can be implemented in any manner, e.g., by a local area computer network, a wide area computer network (e.g., the Internet), point-to-point connections, etc., or any combination thereof. The communication conduit(s) 828 can include any combination of hardwired links, wireless links, routers, gateway functionality, name servers, etc., governed by any protocol or combination of protocols.

FIG. 8 shows the computing device 802 as being composed of a discrete collection of separate units. In some cases, the collection of units may correspond to discrete hardware units provided in a computing device chassis having any form factor. FIG. 8 shows illustrative form factors in its bottom portion. In other cases, the computing device 802 can include a hardware logic unit that integrates the functions of two or more of the units shown in FIG. 1. For instance, the computing device 802 can include a system on a chip (SoC or SOC), corresponding to an integrated circuit that combines the functions of two or more of the units shown in FIG. 8.

The following summary provides a non-exhaustive set of illustrative examples of the technology set forth herein.

According to a first aspect, one or more computing devices are described for processing a given query item. The computing device(s) include: a first encoder for transforming the given query item into an encoded query item, the given query item including one or more parts; a second encoder for transforming a given target item into an encoded target item, the given target item including one or more parts; and a similarity-assessing mechanism for determining a semantic similarity between the given query item and the given target item based on the encoded query item and the encoded target item. Each of the first encoder and the second encoder includes at least one transformation unit, a transformation unit including at least a self-attention mechanism and a feed-forward network. The self-attention mechanism is configured to interpret each part under consideration in a given item by determining a relevance of each other part in the given item to the part under consideration, to provide a self-attention output result. The feed-forward network is configured to transform the self-attention output result into a feed-forward network output result using a feed-forward neural network. The first encoder, second encoder, and similarity-assessing mechanism are implemented by hardware logic circuitry provided by the computing device(s).

According to a second example, the first encoder and the second encoder include an identical set of machine-trained model parameter values.

According to a third example, the first encoder and the second encoder include different respective sets of machine-trained model parameter values.

According to a fourth example, the given query item is a given query expression including one or more query-expression linguistic tokens, and the given target item is a given target expression including one or more target-expression linguistic tokens.

According to a fifth example, relating to the fourth example, each of the first encoder and the second encoder includes a linguistic encoding mechanism that is configured to transform a given linguistic token into a character n-gram representation of the given linguistic token.

According to a sixth example, each of the first encoder and the second encoder includes a pooling mechanism for converting plural transformer output vectors provided by the transformation unit(s) into a single output vector.

According to a seventh example, relating to the sixth example, the pooling mechanism computes the single output vector by taking an elementwise weighted average of the plural transformer output vectors.

According to an eighth example, relating to the sixth example, the given item includes a classification token in addition to one or more linguistic tokens. Further, one of the transformer output vectors includes an encoded counterpart of the classification token. The pooling mechanism is configured to use the encoded counterpart of the classification token as the single output vector.

According to a ninth example, the similarity-assessing mechanism is configured to determine the semantic similarity between the given query item and the given target item by determining a cosine similarity between the encoded query item and the encoded target item.

According to a tenth example, the similarity-assessing mechanism is configured to determine the semantic similarity between the given query item and the given target item by determining an elementwise maximum x of the encoded query item and the encoded target item, and then using a residual mechanism to provide a value y given by $f(x, W, b)+x$, where $f$ is a machine-trained function of x, and where W and b are machine-trained parameter values.

According to an eleventh example, the computing device(s) further include: an interface mechanism configured to receive the given query item from a user computing device; a matching engine configured to use the similarity-assessing mechanism to assess the semantic similarity between the given query item and one or more given target items based on the encoded query item provided by the first encoder and one or more encoded target items provided by the second encoder, to produce a matching result; and a post-matching processing engine configured to generate a query result based on the matching result. The interface mechanism is further configured to deliver the query result to the user computing device. Further, the interface mechanism, matching engine, and post-matching processing engine are implemented by the hardware logic circuitry.

According to a twelfth example, relating to the eleventh example, the first encoder and the second encoder produce the encoded query item and the encoded target item, respectively, in response to receipt of the given query item from the user.

According to a thirteenth example, relating to the eleventh example, the second encoder produces each of the encoded target items in an offline manner prior to receipt of the given query expression.

According to a fourteenth example, relating to the eleventh example, the matching engine is configured to use a nearest-neighbor search algorithm to find at least one encoded target item that matches the encoded target item.

According to a fifteenth example, a system is described for processing a given query expression. The system includes: an interface mechanism configured to receive the given query expression from a user computing device; a first encoder for transforming the given query expression into an encoded query expression, the given query expression including one or more query-expression linguistic tokens; a second encoder for transforming a given target expression into an encoded target expression, the given target expression including one or more target-expression linguistic tokens; a matching engine configured to use a similarity-assessing mechanism to assess a semantic similarity between the given query expression and the given target expression based on the encoded query expression provided by the first encoder and the encoded target expression provided by the second encoder, to produce a matching result; and a post-matching processing engine configured to generate a query result based on the matching result. The interface mechanism is further configured to deliver the query result to the user computing device. Each of the first encoder and the second encoder includes at least one transformation unit, a transformation unit including at least a self-attention mechanism that is configured to interpret each linguistic token under consideration in a given expression by determining a relevance of each other linguistic token in the given expression to the linguistic token under consideration. The interface mechanism, first encoder, second encoder, matching engine, similarity-assessing mechanism, and post-matching processing engine are implemented by hardware logic circuitry provided by the system. And at least the first encoder and the second encoder are formulated as respective multi-level neural networks.

According to a sixteenth example, relating to the fifteenth example, the given target expression is a document, an answer to a question, or a key phrase associated with a digital advertisement.

According to a seventeenth example, relating to the fifteenth example, the first encoder produces the encoded query expression in response to receipt of the given query expression from the user.

According to an eighteenth example, relating to the fifteenth example, the second encoder produces the encoded target expression in an offline manner prior to receipt of the given query expression.

According to a nineteenth example, a method is described for processing a given query item using hardware logic circuitry provided by one or more computing devices. The method includes: receiving the given query item from a user computing device, the given query item including one or more parts; using a first encoder to transform the given query item into an encoded query item; using a second encoder to transform a given target item into an encoded target item, the given target item also including one or more parts; determining a semantic similarity between the given query item and the given target item based on the encoded query item and the encoded target item; and providing a query result to the user computing device that is based on the operation of determining. Each of the first encoder and the second encoder includes at least one transformation unit, a transformation unit including at least a self-attention mechanism that is configured to interpret each part under consideration in a given item by determining a relevance of each other part in the given item to the part under consideration.

According to a twentieth example, relating to the nineteenth example, the operation of using the second encoder is performed in an offline manner prior to receipt of the given query item.

A twenty-first aspect corresponds to any combination (e.g., any logically consistent permutation or subset) of the above-referenced first through twentieth examples.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first examples.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for processing a given query item, comprising:
    a first encoder for transforming the given query item into an encoded query item, the given query item including one or more parts;
    a second encoder for transforming a given target item into an encoded target item, the given target item including one or more parts; and
    a similarity-assessing mechanism for determining a semantic similarity between the given query item and the given target item based on the encoded query item and the encoded target item,
    each of the first encoder and the second encoder including at least one transformation unit, a transformation unit including at least a self-attention mechanism and a feed-forward network,
    the self-attention mechanism being configured to interpret each part under consideration in a given item by determining a relevance of each other part in the given item to the part under consideration, to provide a self-attention output result, the given item corresponding to either the given query item or the given target item,
    the feed-forward network being configured to transform the self-attention output result into a feed-forward network output result using a feed-forward neural network, and
    the first encoder, second encoder, and similarity-assessing mechanism being implemented by hardware logic circuitry provided by said one or more computing devices,
    the similarity-assessing mechanism being configured to determine the semantic similarity between the given query item and the given target item using a residual function by: determining an elementwise maximum of the encoded query item and the encoded target item; using a machine-trained function to map the elementwise maximum to an output result; and adding the elementwise maximum to the output result.

2. The one or more computing devices of claim 1, wherein the first encoder and the second encoder include an identical set of machine-trained model parameter values.

3. The one or more computing devices of claim 1, wherein the first encoder and the second encoder include different respective sets of machine-trained model parameter values.

4. The one or more computing devices of claim 1, wherein the given query item is a given query expression including one or more query-expression linguistic tokens, and wherein the given target item is a given target expression including one or more target-expression linguistic tokens.

5. The one or more computing devices of claim 4, wherein each of the first encoder and the second encoder includes a linguistic encoding mechanism that is configured to transform a given linguistic token into a character n-gram representation of the given linguistic token, the given linguistic token corresponding to either a given query-expression linguistic token or given target-expression linguistic token.

6. The one or more computing devices of claim 1, wherein each of the first encoder and the second encoder includes a pooling mechanism for converting plural transformer output vectors provided by said at least one transformation unit into a single output vector.

7. The one or more computing devices of claim 6, wherein the pooling mechanism computes the single output vector by taking an elementwise weighted average of the plural transformer output vectors.

8. The one or more computing devices of claim 6,
    wherein the given query item includes a classification token in addition to one or more linguistic tokens,
    wherein one of the transformer output vectors includes an encoded counterpart of the classification token, and
    wherein the pooling mechanism is configured to use the encoded counterpart of the classification token as the single output vector.

9. The one or more computing devices of claim 1, wherein the similarity-assessing mechanism is configured to determine the semantic similarity between the given query item and the given target item by determining a cosine similarity between the encoded query item and the encoded target item.

10. The one or more computing devices of claim 1, further including:
    an interface mechanism configured to receive the given query item from a user computing device;
    a matching engine configured to use the similarity-assessing mechanism to assess the semantic similarity between the given query item and one or more given target items based on the encoded query item provided by the first encoder and one or more encoded target items provided by the second encoder, to produce a matching result; and
    a post-matching processing engine configured to generate a query result based on the matching result,
    the interface mechanism being further configured to deliver the query result to the user computing device,
    the interface mechanism, matching engine, and post-matching processing engine being implemented by the hardware logic circuitry.

11. The one or more computing devices of claim 10, wherein the first encoder and the second encoder produce the encoded query item and the encoded target items, respectively, in response to receipt of the given query item from the user.

12. The one or more computing devices of claim 10, wherein the second encoder produces each of the encoded target items in an offline manner prior to receipt of the given query item.

13. The one or more computing devices of claim 10, wherein the matching engine is configured to use a nearest-neighbor search algorithm to find at least one encoded target item that matches the encoded target item.

14. A system for processing a given query expression, the system comprising:

an interface mechanism configured to receive the given query expression from a user computing device;

a first encoder for transforming the given query expression into an encoded query expression, the given query expression including one or more query-expression linguistic tokens;

a second encoder for transforming a given target expression into an encoded target expression, the given target expression including one or more target-expression linguistic tokens;

a matching engine configured to use a similarity-assessing mechanism to assess a semantic similarity between the given query expression and the given target expression based on the encoded query expression provided by the first encoder and the encoded target expression provided by the second encoder, to produce a matching result; and a post-matching processing engine configured to generate a query result based on the matching result, the interface mechanism being further configured to deliver the query result to the user computing device, each of the first encoder and the second encoder including at least one transformation unit, a transformation unit including at least a self-attention mechanism that is configured to interpret each linguistic token under consideration in a given expression by determining a relevance of each other linguistic token in the given expression to the linguistic token under consideration, the given expression corresponding to either the given query expression or the given target expression, the interface mechanism, first encoder, second encoder, matching engine, similarity-assessing mechanism, and post-matching processing engine being implemented by hardware logic circuitry provided by the system, and at least the first encoder and the second encoder being formulated as respective multi-level neural networks, the similarity-assessing mechanism being configured to determine the semantic similarity between the given query expression and the given target expression using a residual function by: determining an elementwise maximum of the encoded query expression and the encoded target expression; using a machine-trained function to map the elementwise maximum to an output result; and adding the elementwise maximum to the output result.

15. The system of claim 14, wherein the given target expression is a document, an answer to a question, or a key phrase associated with a digital advertisement.

16. The system of claim 14, wherein the first encoder produces the encoded query expression in response to receipt of the given query expression from the user.

17. The system of claim 14, wherein the second encoder produces the encoded target expression in an offline manner prior to receipt of the given query expression.

18. A method for processing a given query item using hardware logic circuitry provided by one or more computing devices, comprising:

receiving the given query item from a user computing device, the given query item including one or more parts;

using a first encoder to transform the given query item into an encoded query item;

using a second encoder to transform a given target item into an encoded target item, the given target item also including one or more parts;

determining a semantic similarity between the given query item and the given target item based on the encoded query item and the encoded target item; and providing a query result to the user computing device that is based on said determining, each of the first encoder and the second encoder including at least one transformation unit, a transformation unit including at least a self-attention mechanism that is configured to interpret each part under consideration in a given item by determining a relevance of each other part in the given item to the part under consideration, the given item corresponding to either the given query item or the given target item, the first encoder and the second encoder operating using a transformer-based student model, the transformer-based student model being produced by:

fine-tuning a pre-trained transformer-based model, to produce a fine-tuned teacher model, the training of the fine-tuned teacher model being based on training examples that include pairs of query items and target items, the pre-trained transformer-based model including a single-chain encoder that is fed concatenated pairs of the query items and target items;

producing labels for a plurality of respective samples based on outputs produced by the fine-tuned model;

producing probabilities for the samples using the student model; and training the student model using a loss function that depends on the probabilities and labels.

19. The method of claim 18, wherein said using the second encoder is performed in an offline manner prior to receipt of the given query item.

\* \* \* \* \*